United States Patent
Duggal et al.

(10) Patent No.: US 9,221,941 B2
(45) Date of Patent: Dec. 29, 2015

(54) POLYURETHANE ELASTOMERS MADE USING MIXTURES OF ALIPHATIC DIOL CHAIN EXTENDER AND SECONDARY AMINE

(75) Inventors: Rajat Duggal, Pearland, TX (US); Nathan Wilmot, Missouri City, TX (US); Richard Keaton, Pearland, TX (US); Alan K. Schrock, Pensacola Beach, FL (US)

(73) Assignee: Dow Global Technologies LLC, Midland, MI (US)

( * ) Notice: Subject to any disclaimer, the term of this patent is extended or adjusted under 35 U.S.C. 154(b) by 284 days.

(21) Appl. No.: 13/990,488

(22) PCT Filed: Nov. 16, 2011

(86) PCT No.: PCT/US2011/060901
§ 371 (c)(1),
(2), (4) Date: May 30, 2013

(87) PCT Pub. No.: WO2012/078322
PCT Pub. Date: Jun. 14, 2012

(65) Prior Publication Data
US 2013/0253084 A1    Sep. 26, 2013

Related U.S. Application Data

(60) Provisional application No. 61/420,385, filed on Dec. 7, 2010.

(51) Int. Cl.
C08G 18/28 (2006.01)
C08G 18/08 (2006.01)
C08G 18/10 (2006.01)
C08G 18/12 (2006.01)
C08G 18/32 (2006.01)
C08G 18/65 (2006.01)
C08G 18/66 (2006.01)
C08G 18/22 (2006.01)

(52) U.S. Cl.
CPC ............... *C08G 18/08* (2013.01); *C08G 18/10* (2013.01); *C08G 18/12* (2013.01); *C08G 18/14* (2013.01); *C08G 18/222* (2013.01); *C08G 18/2865* (2013.01); *C08G 18/325* (2013.01); *C08G 18/3271* (2013.01); *C08G 18/3275* (2013.01); *C08G 18/3278* (2013.01); *C08G 18/3281* (2013.01); *C08G 18/6523* (2013.01); *C08G 18/6529* (2013.01); *C08G 18/6535* (2013.01); *C08G 18/6614* (2013.01); *C08G 18/6618* (2013.01); *C08G 18/6622* (2013.01); *C08G 18/6648* (2013.01); *C08G 18/6651* (2013.01); *C08G 18/6655* (2013.01); *C08G 18/6681* (2013.01); *C08G 18/6685* (2013.01); *C08G 18/6688* (2013.01)

(58) Field of Classification Search
CPC ........ C08G 18/08; C08G 18/10; C08G 18/12; C08G 18/14; C08G 18/222; C08G 18/2865; C08G 18/325; C08G 18/327; C08G 18/3271; C08G 18/3275; C08G 18/3281; C08G 18/6523; C08G 18/6529; C08G 18/6535; C08G 18/6614; C08G 18/6618; C08G 18/6622; C08G 18/6648; C08G 18/6651; C08G 18/6655; C08G 18/6681; C08G 18/6685; C08G 18/6688
See application file for complete search history.

(56) References Cited

U.S. PATENT DOCUMENTS

| 4,808,636 A * | 2/1989 | Saito et al. ............ 521/163 |
| 5,364,852 A * | 11/1994 | Hinz et al. ............ 521/159 |
| 5,677,413 A | 10/1997 | Barksby |
| 5,770,673 A | 6/1998 | Markusch et al. |
| 6,734,273 B2 * | 5/2004 | Onder ............ 528/76 |
| 2002/0052461 A1 * | 5/2002 | Forschner et al. ............ 528/85 |
| 2004/0214937 A1 | 10/2004 | Miller |
| 2005/0070665 A1 | 3/2005 | Ludlow |
| 2007/0142601 A1 | 6/2007 | Nodelman |
| 2007/0191567 A1 * | 8/2007 | Tsuge et al. ............ 528/44 |
| 2011/0118373 A1 * | 5/2011 | Prissok et al. ............ 521/174 |

FOREIGN PATENT DOCUMENTS

| EP | 320946 A | 12/1988 |
| WO | 01/07499 A | 2/2001 |

OTHER PUBLICATIONS

Kaushiva et al., Polymer 41 (2000) 6981-6986.

* cited by examiner

*Primary Examiner* — John Cooney
(74) *Attorney, Agent, or Firm* — Gary C. Cohn PLLC

(57) ABSTRACT

Polyurethane elastomers are formed by curing a reaction mixture containing at least one polyisocyanate at least one polyol, an aliphatic diol chain extender and a small amount of a secondary amino compound that may have none or one or more hydroxyl groups. The reaction is catalyzed with a metal catalyst. In certain embodiments, the catalyst is an organozirconium, organotitanium or tertiary amine-based catalyst. The presence of the secondary amine compound in those cases provides for a good surface appearance and good physical properties.

7 Claims, No Drawings

POLYURETHANE ELASTOMERS MADE USING MIXTURES OF ALIPHATIC DIOL CHAIN EXTENDER AND SECONDARY AMINE

This application claims priority from U.S. Provisional Patent Application No. 61/420,385, filed 7 Dec. 2010.

This invention relates to a process for making cast polyurethane elastomers.

Polyurethane elastomers are made by reacting a high equivalent weight polyol and a chain extender material with a polyisocyanate compound. The starting materials are mixed, usually degassed, and transferred into a mold where the elastomer is cured, usually with application of heat. Some or all of the high equivalent weight polyol may be pre-reacted with the polyisocyanate in a preliminary step to form an isocyanate-terminated prepolymer or quasi-prepolymer. Such a prepolymer is then caused to react with the chain extender and optionally a remaining portion of the high equivalent weight polyol during the molding step.

Open time is very important in cast elastomer processes. Once the starting materials are mixed, they must remain in an uncured, flowable state for up to several minutes to allow the mixture to be degassed (in most cases) and transferred into the mold. If the reaction proceeds too quickly, the mold may not fill completely and/or flow lines or other defects may appear in the parts. This can lead to high reject rates.

Once the mold is filled, however, a rapid cure is wanted to reduce cycle times and maximize mold usage.

Polyurethane cast elastomers can be generally characterized into polyurethane types and polyurethane-urea types. The difference between the two types relates to the type of chain extender that is used to produce the elastomer. The polyurethane types are made using a diol chain extender, whereas the polyurethane-urea types are made using a diamine chain extender. Most diamine chain extenders are much more reactive towards isocyanates than are diol chain extenders. Most diamine-extended systems tend to have open times which are too short for the cast elastomer process. Some diamines like methylene bis(2-chloroaniline) provide for long open times, but worker exposure issues relating to methylene bis(2-chloroaniline) make it an undesirable choice. In addition, the properties of polyurethane-urea elastomers often cannot match those of polyurethane elastomers.

Organomercury compounds are often the catalysts of choice for cast elastomer processes. Organomercury catalysts offer an important combination of attributes, which are extremely difficult to duplicate with other catalyst systems. These organomercury catalysts provide a very desirable curing profile in which a long open time is followed by a rapid cure. A second attribute of organomercury catalysts is that they produce polyurethane elastomers that have very desirable physical and mechanical properties.

A third attribute of organomercury catalysts relates to the appearance of the finished polyurethane product. Organomercury catalysts tend to produce elastomers that have a highly uniform surface appearance, even when the polyurethane system contains large amounts of chain extender.

It is desirable to find a replacement for organomercury catalysts. Such a replacement catalyst system ideally would provide the attributes of organomercury catalysts, including a desirable cure profile, good property development in the product, and good surface appearance.

Unfortunately, few catalysts successfully mimic the performance of the organomercury catalysts. Few other catalysts provide the reaction profile that is wanted. Among the few catalysts that provide a reaction profile similar to that of the organomercury catalysts are certain organozirconium, organotitanate and certain tertiary amine catalysts. However, when the cast polyurethane system contains a large amount of chain extender, the cast elastomers made using these catalysts often exhibit a surface appearance characterized by the presence of discrete transparent or translucent regions together with discrete opaque regions. Such an appearance is often cosmetically unacceptable to the consumer, again resulting in a high reject rate. In certain cases the mechanical properties may also suffer.

It would be desirable to provide a cast elastomer process which provides for an acceptable open time followed by a rapid cure, and which produces an elastomer that has acceptable physical properties and an acceptable surface appearance. It is also desirable to achieve these results while avoiding the use of mercury-containing catalysts.

This invention is in one aspect a process for preparing a noncellular or microcellular polyurethane elastomer, comprising 1) forming a reaction mixture containing a) one or more aliphatic diols having a hydroxyl equivalent weight of from about 30 to about 100, b) one or more secondary amine compounds having a molecular weight of 200 or less and at least one of c-1) and c-2), wherein c-1) includes one or more organic polyisocyanates having an isocyanate content of at least 15% by weight and one or more polyols having a hydroxyl equivalent weight of at least 250 and c-2) includes one or more isocyanate-terminated prepolymers or quasi-prepolymers having an isocyanate content of less than 15% formed in a reaction of an organic polyisocyanate with one or more polyols having a hydroxyl equivalent weight of at least 250 and 2) curing the reaction mixture in the presence of a catalyst to form the polyurethane elastomer, wherein:

A) the reaction mixture contains no more than 0.25% by weight of a chemical blowing agent;

B) the secondary amine compound contains from one to four secondary amino groups, is devoid of primary amino groups, and contains from zero to three hydroxyl groups, provided that the combined number of secondary amino groups and hydroxyl groups is from one to four;

3) the weight ratio of component a) to component b) is from 60:40 to 95:5;

4) the hard segment content of the polyurethane elastomer is from 30 to 60% by weight; and 5) the isocyanate index is from 70 to 125.

A "noncellular" elastomer is essentially devoid of cells or other voids produced by gasses present during the curing step. A noncellular elastomer typically has a bulk density of at least 0.9 g/cc and/or a void volume of 5% or less. A "microcellular" elastomer, for purposes of this invention, is produced by conducting the curing step in the presence of a small amount of blowing agent. A "microcellular" elastomer has a bulk density of at least 0.4 g/cc, and more typically has a bulk density of from 0.5 to 0.9 g/cc, and/or a void volume of from 5 to 60%.

The physical properties of elastomers produced in accordance with this invention tend to approximate those that are exhibited by otherwise like polyurethane elastomers having the same hard segment content, but which are made without the secondary amine compound (component b). Surprisingly, these elastomers also exhibit a highly uniform surface appearance, with few if any transparent or translucent regions interspersed among opaque regions. This desirable surface appearance is even seen when no organomercury catalysts are present in the reaction system. Elastomers having good surface appearance can be produced even when organozirconium, organotitanate or tertiary amine catalysts are used instead of organomercury catalysts.

Component a) is one or more aliphatic diols that have a hydroxyl equivalent weight of from 30 to about 100, preferably from 31 to 60. Materials of this type are commonly known as "chain extenders". By "aliphatic diol", it is meant a compound having exactly two hydroxyl groups, each of which is bound to an aliphatic (or cycloaliphatic) carbon atom. Representative chain extenders include ethylene glycol, diethylene glycol, triethylene glycol, 1,2-propylene glycol, 1,3-propane diol, 1,4-butane diol, 1,6-hexane diol, neopentyl glycol, dipropylene glycol, tripropylene glycol and cyclohexanedimethanol. A mixture of two or more aliphatic diols having a hydroxyl equivalent weight from 30 to 100 may be used.

Component a) suitably constitutes at least 5 weight percent of the reactive components (i.e., isocyanates and isocyanate-reactive materials) of the reaction mixture, and may constitute as much as 25% by weight thereof. In some embodiments, component a) will constitute from 6 to 15% or from 6.5 to 12% of the weight of the reactive components of the reaction mixture.

Component b) is one or more compounds that have a molecular weight of up to 200, contains from one to four secondary amino groups, is devoid of primary amino groups, and contains from zero to three hydroxyl groups. The combined number of secondary amino groups and hydroxyl groups is from one to four. The component b) compounds should be devoid of groups, other than secondary amino and hydroxyl groups, which are reactive towards isocyanates. Preferred component b) compounds have one or two secondary amino groups, from zero to two hydroxyl groups and a combined number of from 1 to 3, especially from 1 to 2 secondary amino and hydroxyl groups.

Dialkyl amines and substituted dialkyl amines are among the suitable component b) materials. The alkyl groups may be the same or different from each other, and each may contain up to about 10 carbon atoms, provided that the dialkyl amine has a molecular weight of no more than 200. The alkyl groups each preferably have from 1 to 3 atoms, and are preferably methyl, ethyl or propyl. The alkyl groups may be substituted with substituent groups that are not reactive under the conditions of the curing reaction. Examples of such substituent groups include halogen (especially chlorine), aryl, nitro, ether, ester, phenyl, alkyl-substituted phenyl, and the like. Specific dialkyl amines that are useful include, for example, dimethyl amine, diethyl amine, diisopropylamine, methyl ethyl amine, dibenzyl amine, and the like.

Di(aryl)amines such as diphenyl amine and monoaryl monoalkyl amines such as methyl phenyl amine or ethyl phenyl amine are also useful as a component b) materials. The aryl group(s) may be mononuclear or polynuclear types, provided that the compound has a molecular weight of 200 or lower. Polynuclear types can be fused or bridged structures. The aryl groups in a di(aryl) amine may be the same or different from each other. The alkyl group of a monoaryl monoalkyl amine may contain up to 10, preferably up to 4, carbon atoms. The aryl and/or alkyl groups of these compounds may be substituted as described with respect to the dialkyl amines.

Alicyclic compounds that contain one or more secondary nitrogen atoms in the ring structure are also useful. These include, for example, piperidine, morpholine, piperazine and the like. The carbon atoms on the ring structure may be substituted as described before.

Dialkanol amines such as diethanolamine and diisopropanol amine are also useful component b) materials. Similarly, the reaction product of a diamine such as ethylene diamine with about three moles of an alkylene oxide such as ethylene oxide and/or propylene oxide per mole of diamine are useful. These reaction products have on average one secondary amine group and three hydroxyl groups per molecule.

Monoalkylmonoalkanolamines are also useful component b) materials. The alkyl group may contain from 1 to 10, preferably from 1 to 3 carbon atoms and more preferably 1 or 2 carbon atoms. The alkanol group may contain from 2 to 10, preferably from 2 to 4 and more preferably 2 carbon atoms. The alkyl or alkanol group may be substituted as described before. Suitable monalkylmonoalkanolamines include, for example, compounds such as 2-(methylamino)ethanol, 2-(ethylamino)ethanol, 2-(propylamino)ethanol, 1-methyl-2-(methylamino)ethanol, 1-methyl-2-(ethylamino)ethanol, 1-methyl-2-(propylamino)ethanol, 1-ethyl-2-(methylamino)ethanol, 1-ethyl-2-(ethylamino)ethanol, 1-ethyl-2-(propylamino)ethanol, N-hydroxyethylbenzylamine, N-hydroxypropylbenzylamine and the like.

Components a) and b) are present in the reaction mixture at a weight ratio of at least 60:40 (60 parts of component a) to 40 parts of component b)) to as much as 95:5. A preferred ratio is from 70:30 to 95:5. In some embodiments, this ratio may be from 80:20 to 95:5.

The reaction mixture preferably contains no more than 5%, preferably no more than 2% and still more preferably no more than 0.25% by weight of crosslinkers. By crosslinkers, it is meant isocyanate-reactive compounds having at least three isocyanate-reactive groups and molecular weights of 250 or less per isocyanate-reactive group. The reaction mixture preferably contains no more than 1%, more preferably no more than 0.25%, by weight of compounds that contain one or more primary amine groups.

The reaction mixture contains at least one organic polyisocyanate. In certain embodiments (c-1), the organic polyisocyanate has an isocyanate content of 15% or more by weight, and the reaction mixture further contains at least one polyol having a hydroxyl equivalent weight of at least 250. In other embodiments (c-2), the organic polyisocyanate is or includes one or more isocyanate-terminated prepolymers or quasi-prepolymers having an isocyanate content of less than 15%, and which is formed in a reaction of an organic polyisocyanate with one or more polyols having a hydroxyl equivalent weight of at least 250. In the latter (c-2) case, it is not necessary that the reaction mixture further contain a polyol having a hydroxyl equivalent weight of at least 250, unless needed to bring the hard segment content of the elastomer to within the range of 30 to 60. The two types of embodiments correspond approximately to the well-known "one-step" and "two-step" processes for preparing polyurethane elastomers.

Suitable organic polyisocyanates contain an average of at least 1.5 and preferably at least 1.8 or at least 2.0 isocyanate groups per molecule. The organic polyisocyanate may contain as many as 8 isocyanate groups per molecule, but typically contains no more than about 4 isocyanate groups and preferably no more than 3.5 or no more than 2.5 isocyanate groups per molecule. The organic polyisocyanate may contain as little as about 15% by weight isocyanate groups, or may contain as much as about 50% by weight isocyanate groups. It preferably contains at least 25% by weight isocyanate groups. The isocyanate groups may be bonded to aromatic, aliphatic or cycloaliphatic carbon atoms.

Examples of useful polyisocyanates include m-phenylene diisocyanate, toluene-2,4-diisocyanate, toluene-2,6-diisocyanate, hexamethylene-1,6-diisocyanate, tetramethylene-1,4-diisocyanate, cyclohexane-1,4-diisocyanate, hexahydrotoluene diisocyanate, naphthylene-1,5-diisocyanate, methoxyphenyl-2,4-diisocyanate, diphenylmethane-4,4'-diisocyanate, 4,4'-biphenylene diisocyanate, 3,3'-dimethoxy-4, 4'-biphenyl diisocyanate, 3,3'-dimethyl-4-4'-biphenyl diisocyanate, 3,3'-dimethyldiphenyl methane-4,4'-diisocyanate, 4,4',4''-triphenyl methane triisocyanate, a polymethylene polyphenylisocyanate (PMDI), toluene-2,4,6-triisocyanate and 4,4'-dimethyldiphenylmethane-2,2',5,5'-tetraisocyanate. Diphenylmethane-4,4'-diisocyanate, diphenylmethane-2,4'-diisocyanate and mixtures thereof are generically referred to herein as MDI. Toluene-2,4-diisocyanate, toluene-2,6-diisocyanate and mixtures thereof are generically referred to as TDI.

Any of the foregoing isocyanates can be modified to include urethane, urea, biuret, carbodiimide, allophonate, uretonimine, isocyanurate, amide or like linkages. Examples of modified isocyanates of these types include various urethane group and/or urea group-containing prepolymers, some of which are described in more detail below, and so-called "liquid MDI" products, and the like.

Aliphatic polyisocyanates are preferred when light stability is needed. In other cases, TDI, MDI or an MDI derivative is often useful. MDI may be the 2,2'-, 2,4'- or 4,4'-isomer, with the 4,4'-isomer, or mixtures of the 4,4'- and 2,4'-isomer, being preferred. "Derivatives" of MDI are MDI that has been modified to include urethane, urea, biuret, carbodiimide, uretonimine or like linkages, and which have an isocyanate content of at least 15%, preferably at least 25% by weight.

The polyol of component c-1) or c-2) has a hydroxyl equivalent weight of at least 250. By "polyol", it is meant that the material has an average of at least 1.8 hydroxyl groups per molecule. The polyol material may contain an average of up to 8 hydroxyl groups per molecule. It preferably contains from 2 to 4, more preferably from 2 to 3 hydroxyl groups per molecule. The hydroxyl equivalent weight is preferably at least 500 and more preferably from 500 to 3000, still more preferably from 750 to 2100.

A mixture of two or more polyols, each having at least 1.8 hydroxyl groups per molecule and a hydroxyl equivalent weight of at least 250, can be used.

Examples of suitable polyols that have hydroxyl equivalent weights of 250 or more include hydroxyl-functional acrylate polymers and copolymers, hydroxyl-functional polybutadiene polymers, polyether polyols, polyester polyols, amine-terminated polyethers, and various polyols that are based on vegetable oils or animal fats. Polyether polyols are preferred among these.

Useful polyether polyols include, for example, polymers of propylene oxide, ethylene oxide, 1,2-butylene oxide, tetramethylene oxide, block and/or random copolymers thereof, and the like. Of particular interest are poly(propylene oxide) homopolymers, random copolymers of propylene oxide and ethylene oxide in which the oxyethylene content is, for example, from about 1 to about 30% by weight, ethylene oxide-capped poly(propylene oxide) polymers which contain from 70 to 100% primary hydroxyl groups and ethylene oxide-capped random copolymers of propylene oxide and ethylene oxide in which the oxyethylene content is from about 1 to about 30% by weight. The polyether polyols may contain low terminal unsaturation (for example, less than 0.02 meq/g or less than 0.01 meq/g), such as those made using so-called double metal cyanide (DMC) catalysts, as described for example in U.S. Pat. Nos. 3,278,457, 3,278,458, 3,278,459, 3,404,109, 3,427,256, 3,427,334, 3,427,335, 5,470,813 and 5,627,120. Polymer polyols of various sorts may be used as well. Polymer polyols include dispersions of polymer particles, such as polyurea, polyurethane-urea, polystyrene, polyacrylonitrile and polystyrene-co-acrylonitrile polymer particles, in a polyol, typically a polyether polyol. Suitable polymer polyols are described in U.S. Pat. Nos. 4,581,418 and 4,574,137.

Useful polyester polyols include reaction products of polyols, preferably diols, with polycarboxylic acids or their anhydrides, preferably dicarboxylic acids or dicarboxylic acid anhydrides. The polycarboxylic acids or anhydrides may be aliphatic, cycloaliphatic, aromatic and/or heterocyclic and may be substituted, such as with halogen atoms. The polycarboxylic acids may be unsaturated. Examples of these polycarboxylic acids include succinic acid, adipic acid, terephthalic acid, isophthalic acid, trimellitic anhydride, phthalic anhydride, maleic acid, maleic acid anhydride and fumaric acid. The polyols used in making the polyester polyols preferably have an equivalent weight of 150 or less and include ethylene glycol, 1,2- and 1,3-propylene glycol, 1,4- and 2,3-butane diol, 1,6-hexane diol, 1,8-octane diol, neopentyl glycol, cyclohexane dimethanol, 2-methyl-1,3-propane diol, glycerine, trimethylol propane, 1,2,6-hexane triol, 1,2,4-butane triol, trimethylolethane, pentaerythritol, quinitol, mannitol, sorbitol, methyl glycoside, diethylene glycol, triethylene glycol, tetraethylene glycol, dipropylene glycol, dibutylene glycol and the like. Polycaprolactone polyols are useful. Polymer polyols of various sorts may be used as well.

Polyols based on vegetable oils and/or animal fats include, for example, castor oil, hydroxymethyl group-containing polyols as described in WO 2004/096882 and WO 2004/096883, amide group-containing polyols as described in WO 2007/019063, hydroxyl ester-substituted fatty acid esters as described in WO 2007/019051, "blown" soybean oils as described in US Published Patent Applications 2002/0121328, 2002/0119321 and 2002/0090488, oligomerized vegetable oil or animal fat as described in WO 06/116456, hydroxyl-containing cellulose-lignin materials, hydroxyl-containing modified starches as well as the various types of renewable-resource polyols described in Ionescu, *Chemistry and Technology of Polyols for Polyurethanes*, Rapra Publishers 2005.

The ratio of isocyanate-containing compounds to isocyanate-reactive compounds in the reaction mixture is typically expressed as "isocyanate index" which for purposes of this invention means 100 times the ratio of isocyanate groups to isocyanate-reactive groups provided by the isocyanate-reactive materials. The isocyanate index is at least 70, and may be up to 125. The isocyanate index may be at least 80, least 90 or at least 95, and is may be up to 115 or up to about 110.

The type and proportions of ingredients are also selected such that the polyurethane elastomer has a hard segment content of from 30 to 60% by weight, preferably from 35 to 50% by weight. For purposes of this invention, "hard segment content" is the fraction of the weight of the polyurethane elastomer that is contributed by the polyisocyanate(s) and the chain extender(s) (i.e., the component a) materials), is indicated by equation I:

$$\%_{HS} = 100\% \times \frac{W_{iso} + W_a}{W_t} \quad (I)$$

In equation 1, % Hs is the % hard segment content by weight. $W_{iso}$ is the weight of the polyisocyanates having an isocyanate content of 15% or more that are either present in the reaction mixture or used (in the c-2 case) to make the isocyanate-terminated prepolymer or quasi-prepolymer. $W_{iso}$ does not include the weight of any polyols having a hydroxyl equivalent weight of 250 or more that are used to prepare a prepolymer or quasi-prepolymer in the c-2 case. $W_a$ is the weight of the chain extender(s) (i.e., the component a) materials) which are used to make the elastomer. $W_t$ is the combined weight of all polyisocyanates and isocyanate-reactive materials used to produce the elastomer (including the component a) and b) materials and the component c-1) and/or c-2) materials as the case may be). $W_t$ includes the weight of catalysts. $W_t$ does not include the weight of blowing agents, fillers or reinforcing agents as may be present in the reaction mixture, or other ingredients which do not react to form part of the polyurethane polymer structure. In simple cases in which components a), b) and c-1) and/or c-2) are the only reactive components, the hard segment content can be expressed as:

$$\%_{HS} = 100 \times \frac{W_{iso} + W_a}{W_{iso} + W_a + W_b + W_{cat} + W_p} \quad \text{(II)}$$

where $\%_{HS}$ and $W_{iso}$ are as before, $W_a$ is the weight of component a), $W_b$ is the weight of component b), $W_{cat}$ is the weight of the catalyst and $W_p$ is the weight of all polyol(s) that have a hydroxyl equivalent weight of 250 or more that are present in the reaction mixture and/or, in the c-2) case, used to form the prepolymer or quasi-prepolymer.

The elastomer is prepared by forming a reaction mixture containing components a), b) and at least one of c-1) or c-2), and curing the mixture in the presence of a metal-containing catalyst. A process that includes the c-1) materials is generally known as a "one-step" process; a process that includes the c-2) materials is generally known as a "prepolymer" or "two-step" process.

In the one-step process, the reaction mixture contains components a), b) and c-1) as described before, together with the catalyst and any optional ingredients as may be present. In the two-step process, the reaction mixture contains components a), b) and c-2), together with the catalyst and any optional ingredients as may be present. The reaction mixture in the two-step case may further include one or more polyols that have an equivalent weight of 250 or more.

The prepolymer or quasi-prepolymer c-2) is a reaction product of at least one organic polyisocyanate having an isocyanate content of at least 15%, preferably at least 25%, by weight with one or more polyols that have a hydroxyl equivalent weight of at least 250, as described before. By "prepolymer", it is meant a reaction product of approximately one mole of polyisocyanate per equivalent of hydroxyl groups on the polyol; the resulting prepolymer contains isocyanate-terminated adducts of the polyol and at most a small amount (up to 10% by weight) of unreacted polyisocyanate compound. A prepolymer may have an isocyanate content of from 0.5 to about 10% by weight, preferably from 0.5 to 5% by weight. By "quasi-prepolymer, it is meant a reaction product of more than one mole of polyisocyanate per equivalent of hydroxyl groups provided by the polyol. The resulting quasi-prepolymer is a mainly a mixture of isocyanate-terminated adducts of the polyol and polyisocyanate and some quantity (typically from 10 to 50% by weight) of unreacted polyisocyanate compound. In either case, some coupling of polyol molecules can occur to produce a small amount of higher molecular weight materials. The prepolymer or quasi-prepolymer c-2) material should contain an average of from about 1.9 to about 4.0 preferably from 2.0 to 3.5 and more preferably from 2.0 to 3.0 isocyanate groups per molecule.

A low (up to 300) molecular weight diol also may be used to make the quasi-prepolymer, in addition to the foregoing ingredients. This low molecular weight diol preferably has a molecular weight of from 62 to 200. Examples of the low molecular weight diol include ethane diol, 1,2- or 1,3-propane diol, diethylene glycol, dipropylene glycol, triethylene glycol, tripropylene glycol, cyclohexanedimethanol, and the like. This material is usually used in small amounts, if at all. If used in making the prepolymer or quasi-prepolymer, from 1 up to 25 parts by weight thereof may be used per 100 parts by weight of the polyol(s) having an equivalent weight of 250 or more. In calculating hard segment content, this low molecular weight diol is counted as a chain extender (i.e., part of component $W_a$ in equation I).

The reaction mixture is cured in the presence of a metal-containing or a tertiary amine catalyst. Examples of metal catalysts include, for example, metal chelates of metals such as Be, Mg, Al, Zn, Cd, Pd, Ti, Zr, Sn, As, Bi, Cr, Mo, Mn, Fe, Co and Ni. The chelating agent may be, for example, acetylacetone, benzoylacetone, trifluoroacetyl acetone, ethyl acetoacetate and the like. Acidic metal salts of strong acids are also useful. Examples of these include ferric chloride, stannic chloride, stannous chloride, antimony trichloride, bismuth nitrate and bismuth chloride. Another useful class of metal catalysts includes alcoholates and phenolates of various metals, such as $Ti(OR)_4$, $Sn(OR)_4$ and $Al(OR)_3$, wherein R is alkyl or aryl, and the reaction products of the alcoholates with carboxylic acids, beta-diketones and 2-(N,N-dialkylamino)alcohols. Still another useful class of metal catalysts includes alkaline earth metal, Bi, Pb, Sn or Al carboxylate salts. Tetravalent tin compounds, and tri- or pentavalent bismuth, antimony or arsenic compounds are also useful metal catalysts.

Other suitable catalysts include copper or zinc catalyst complexes that contain at least one copper atom or zinc atom associated with a polydentate ligand that contains at least one nitrogen-containing complexing site. The polydentate ligand contains at least two complexing sites that are spaced apart by at least one atom, and preferably by from 2 to 3 atoms. The complexing sites may, for example, form covalent, dative or ionic bonds to the copper ion. At least one of the complexing sites contains nitrogen. A nitrogen-containing complexing site may be, for example, an amino, enamino or imino group. Some particularly useful types of ligand compounds contain at least one hydroxyl or carbonyl group and at least one amino, enamino or imino group, wherein the amino, enamino or imino group is in the α- or β-position relative to the carbon to which the hydroxyl group is bonded, or to the carbonyl carbon, as the case may be. Ligands of these types include (A) α-amino alcohols; (B) α-imino alcohols, (C) β-amino alcohols or enols, (D) β-imino alcohols or enols, (E) β-enamino alcohols and (F) β-amino keto or β-enamino keto or ester compounds. Other particularly useful types of ligand compounds are (G) β-diketiminate compounds and (H) β-diamine compounds. Any of ligand types (A)-(H) may also contain additional complexing sites. When associated with the copper or zinc ion in the catalyst, these ligands are typically in the corresponding anionic form, in which a hydrogen atom is extracted from a hydroxyl group (forming an alcoholate) and/or an amino group (forming an amide).

Suitable tertiary amine catalysts include acid-blocked types, in which the acid group is, for example, an alkanoic acid having from 1 to 18 carbon atoms, or a phenolic compound. Examples of such acid blocked amine catalysts include, for example, formic acid-blocked bis(dimethylaminoethyl)ether, formic acid-blocked triethylenediamine, 2-ethylhexanoic acid-blocked 1,8-diazabicyclo-5,4,0-undecene-7, phenol-blocked 1,8-diazabicyclo-5,4,0-undecene-7 and formic acid-blocked 1,8-diazabicyclo-5,4,0-undecene-7, as well as other acid blocked tertiary amine compounds.

Mercury-containing catalysts can be used, but are not preferred and may be omitted. The mercury-containing catalysts have the benefit of providing a slow initial cure followed by a rapid one; such a catalyst provides a long open time with reasonably short demold times.

The invention is particularly beneficial when the catalyst is a non-mercury catalyst, such as an organozirconium and/or organotitanium catalyst or a tertiary amine catalyst. These catalysts often provide a beneficial curing profile similar to that provided by mercury-containing catalysts, but, in conventional cast elastomer processes which include a large amount of chain extender (such as 5% or more by weight of the reactive components of the reaction mixture) and which do not include the component b) material, often form elastomers that have a poor surface appearance, which is cosmetically unacceptable. It has surprisingly been found that this problem is overcome with the inclusion of small amounts of the component b) material in the reaction mixture. The elastomer has a visually uniform surface appearance when component b) is present, even when non-mercury-containing catalysts such as organozirconium, organotitanium catalysts and/or tertiary amine catalysts are used. In addition, the presence of the component b) material has been found to have little or no adverse effect on the physical properties of the elastomer.

A suitable amount of catalyst is from 0.001 to 5 parts per 100 parts of reactive materials present in the reaction mixture, although amounts may vary depending on the particular polymerization process and the particular reactants that are present. A preferred amount is from 0.05 to 2 parts per 100 parts by weight of the reactive materials.

A wide variety of additional materials may be present in the reaction mixture. Among these materials are physical blowing agents; fillers; pigments and/or colorants; desiccants; reinforcing agents; biocides; preservatives; antioxidants; flame retardants; and the like.

A physical blowing agent may be present if it is desired to form a cellular or microcellular elastomer. However, chemical blowing agents such as water should be present, if at all, in only small quantities, not to exceed 0.25% by weight of the reactive materials in the reaction mixture. Physical blowing agents include materials that are gasses under standard conditions, such as air, nitrogen, argon and the like. Gaseous blowing agents are usually whipped into the reaction mixture before it transferred into a mold and cured. Liquids and supercritical gases that volatilize under the conditions of the curing reaction are also useful blowing agents. Examples of these include various low-boiling chlorofluorocarbons, fluorocarbons, hydrocarbons and the like. Fluorocarbons and hydrocarbons having low or zero global warming and ozone-depletion potentials are preferred among the physical blowing agents. Liquid and supercritical gases are generally mixed into the reaction mixture (or some component thereof) and volatilize during the course of the curing reaction.

The amount of blowing agent can vary considerably, depending on the particular blowing agent used and the desired density of the resulting polymer. The amount of blowing agent(s), if any, is selected to produce a non-cellular or microcellular elastomer.

One or more fillers may also be present. A filler may help modify the composition's rheological properties in a beneficial way, reduce cost and impart beneficial physical properties to the foam. Suitable fillers include particulate inorganic and organic materials that are stable and do not melt at the temperatures encountered during the polyurethane-forming reaction. Examples of suitable fillers include kaolin, montmorillonite, calcium carbonate, wollastonite, talc, high-melting thermoplastics, glass, fly ash, carbon black, titanium dioxide, iron oxide, chromium oxide, azo/diazo dyes, phthalocyanines, dioxazines, colloidal silica and the like. The filler may impart thixotropic properties. Fumed silica is an example of such a filler. When used, fillers advantageously constitute from about 0.5 to about 30%, especially about 0.5 to about 10%, by weight of the polymer.

Some of the foregoing fillers may also impart color to the polymer. Examples of these include titanium dioxide, iron oxide, chromium oxide and carbon black. Other colorants such as azo/diazo dyes, phthalocyanines and dioxazines also can be used.

Reinforcing agents may also be present. The reinforcing agents take the form of particles and/or fibers that have an aspect ratio (ratio of longest dimension to shortest dimension) of at least 3, preferably at least 10. Examples of reinforcing agents include mica flakes, fiber glass, carbon fibers, boron or other ceramic fibers, metal fibers, flaked glass and the like. Reinforcing agents may be formed into mats or other preformed masses.

To prepare the elastomer, the starting materials as described are mixed in ratios that produce an isocyanate index of at least 70 to about 125. A preferred isocyanate index is from 90 to 115, and a more preferred index is from 95 to 110.

The curing conditions are not generally considered to be critical provided that the mixture cures adequately. The reaction mixture is usually transferred to a mold and at least partially cured in the mold. The components or the mixture may be preheated before being introduced into the mold. The mold may be preheated. It is usually necessary to cure the mixture at elevated temperature; for that reason the filled mold is generally heated in an oven or other suitable apparatus. Mold temperatures may be from 40 to 90° C. Curing times can range from as little as one minute to 60 minutes or more. After curing at least to the extent that the resulting elastomer can be removed from the mold without permanent damage or permanent deformation, the part can be demolded. If necessary, the part can be post-cured at an elevated temperature to complete the cure.

The elastomer will of course take the shape of the internal cavity of the mold; therefore the mold is designed to produce a part having the desired external shape and dimensions. A wide range of elastomeric parts can be produced, including gaskets, bushings, wheels, belts, marine elastomers, engineering elastomers and the like. However, shoe soles are an application of particular interest. The shoe sole may be, for example, a midsole, an insole, and outsole, or an integrated sole that performs two or more of these functions.

The following examples are provided to illustrate the invention but are not intended to limit the scope thereof. All parts and percentages are by weight unless otherwise indicated.

EXAMPLES 1-5 AND COMPARATIVE SAMPLES A AND B

Elastomer Examples 1-5 and Comparative Samples A and B are made according to the following general procedure:

A 6000 molecular weight, normally trifunctional ethylene oxide-capped poly(propylene oxide) (Voranol™ CP6001 from The Dow Chemical Company) containing 1% by weight of molecular sieve paste, 1,4-butanediol and the secondary amine compound (if used) are blended at the proportions indicated in Table 1 below. The secondary amine compounds are diethanol amine (DEOA), 2-(methylamino)ethanol (MAE), 2-(ethylamine)ethanol (EAE), 2-(propylamine)ethanol (PAE) and diethylamine (DEA). The blend is then mixed with catalyst as indicated in Table 1, using a high speed mixer. The catalyst is either an organomercury catalyst (Thorcat 535, from Thor Chemicals) or an organotitanium catalyst (SC2210 from Johnson Matthey). The resulting polyol mixture is held at room temperature for at least 30 minutes, and then blended for 90 seconds with a modified MDI having an isocyanate content of 26.3% by weight and average of 2.1 isocyanate groups per molecule (ISONATE™ M340, from The Dow Chemical Company) on the high speed mixer. The resulting reaction mixture is held for another minute, and then poured into an 80° C. open mold and permitted to cure. Tack free time (TFT) is evaluated by manually tapping the surface of the curing mixture. Demold time is evaluated as the time after pouring when the elastomer can be removed from the mold without permanent deformation or tearing. After demolding, the elastomers are post cured at 80° C. for about 16 hours, and physical properties are measured according to ASTM D1708. Results of the physical property testing are as indicated in Table 1.

The surface appearance of the post-cured plaques is evaluated by visual inspection. The surface quality of Comparative Sample A (made with a mercury catalyst) is assigned a "1" (very good, with minimal or no opaque regions interspersed with translucent regions) rating set as a benchmark against which the others are compared. Surface quality is rated on a scale of 1 to 5, with higher numbers indicating poor surface quality. Results of the visual inspection are indicated in Table 1.

some loss in properties is seen, the physical properties of Comparative Sample B are nonetheless considered to be acceptable. However, the surface is cosmetically unacceptable. The surface has large areas in which translucent and opaque polymer are interspersed.

Examples 1-5 show the effect of adding the secondary amine compound. In these examples, the amount of 1,4-butanediol is reduced relative to the Comparative Samples, to obtain an equivalent hard segment content. The differences in hard segment content across this set of experiments are considered to be inconsequential, as are the differences in hardness. Each of Examples 1 to 5 has a much better surface appearance than Comparative Sample B (which is made using the same catalyst). Examples 2, 3 and 5 actually have a surface appearance that is equivalent to that obtained in Example 1 using the organomercury catalyst. There is little or no adverse effect on physical properties and in some cases (Examples 3, 4 and 5) there is a decided increase in modulus.

EXAMPLES 6-8 AND COMPARATIVE SAMPLE C

Polyol blends 6-8 and C are prepared from the components indicated in Table 2. The polyol is the same polyol as described in earlier examples, except that it does not contain molecular sieve paste. Two elastomers are prepared from each of these masterbatches, using the general method described with respect to earlier examples. These elastomers are designated as Examples 6-1, 6-2, 7-1, 7-2, 8-1, 8-2 and Comparative Samples C-1 and C-2, respectively. The

TABLE 1

| | Example/Comparative Sample No. | | | | | | |
|---|---|---|---|---|---|---|---|
| | A* | B* | 1 | 2 | 3 | 4 | 5 |
| | | | Parts by Weight | | | | |
| Ingredient | | | | | | | |
| Polyol/Molecular Sieve Blend | 58.8 | 58.8 | 58.4 | 58.4 | 58.4 | 58.4 | 58.4 |
| 1,4-butanediol | 7.9 | 7.9 | 7.2 | 7.3 | 7.4 | 7.5 | 7.8 |
| Secondary amine, type, amount | None | None | DEOA, 1.02 | MAE, 1.02 | EAE, 1.02 | PAE, 1.0 | DEA, 1.04 |
| Polyisocyanate | 34.7 | 34.7 | 35.8 | 35.9 | 36.8 | 35.4 | 35.7 |
| % Hard segment | 41.8 | 41.8 | 41.9 | 42.0 | 42.5 | 41.8 | 42.1 |
| Catalyst type, amount | Hg, 0.6 | Ti, 0.15 | Ti, 0.11 | Ti, 0.1 | Ti, 0.1 | Ti, 0.1 | Ti, 0.11 |
| Properties | | | | | | | |
| Tack-free time, min | 4.7 | 3.5 | 4.7 | 4.0 | 3.8 | 4 | 3.8 |
| Demold time, min | 6 | 5 | 8 | 4.8 | 4.5 | 5.3 | 4.8 |
| Modulus, MPa | 27.6 | 21.9 | 19.9 | 19.4 | 33.4 | 40.0 | 39.3 |
| Stress at 100% elongation, MPa | 7.8 | 6.6 | 6.6 | 6.8 | 8.0 | 7.6 | 8.0 |
| Ultimate Stress, MPa | 17.9 | 14.2 | 12.3 | 18.8 | 15.1 | 17.3 | 16.5 |
| Elongation, % | 355 | 299 | 239 | 361 | 282 | 378 | 332 |
| Shore A hardness | 89 | 91 | 87 | 87 | 91 | 90 | 91 |
| Surface Appearance rating | 1 | 5 | 2 | 1 | 1 | 3 | 1 |

Comparative Sample A illustrates the properties that are obtained using an organomercury catalyst; it serves as a performance benchmark for the other experiments. Comparative Sample B shows the effect of replacing the organomercury catalyst with an organotitanium catalyst. The organotitanium catalyst is a bit faster than the mercury catalyst. Although amounts of the respective polyol blends and the amount of polyisocyanate are indicated in Table 3. After demolding, the elastomers are post cured at 80° C. for about 1 hour, and physical properties are measured according to ASTM D1708. The measured properties are reported in Table 4 as Examples 6-8 and Comparative Sample C.

TABLE 2

Polyol Blend Composition

| Ingredient | Example or Comparative Sample No. | | | |
|---|---|---|---|---|
| | 6 | 7 | 8 | C* |
| | Parts by Weight | | | |
| Polyol | 292 | 292 | 292.1 | 292 |
| 1,4-butanediol | 36 | 36.4 | 38.9 | 40.5 |
| Diethanolamine | 5 | 0 | 0 | 0 |
| 2-(methylamino)ethanol | 0 | 5 | 0 | 0 |
| Diethylamine | 0 | 0 | 5 | 0 |
| Organotitanium catalyst | 0.5 | 0.5 | 0.5 | 0.5 |

TABLE 3

Elastomer Formulations

| | Elastomer Designation | | | | | | | |
|---|---|---|---|---|---|---|---|---|
| | 6-1 | 6-2 | 7-1 | 7-2 | 8-1 | 8-2 | C-1* | C-2* |
| Parts Polyol Blend | 66.66 | 66.6 | 66.67 | 66.7 | 67.4 | 67.4 | 66.6 | 66.5 |
| Parts Polyisocyanate | 37.7 | 36.1 | 36.6 | 36.0 | 36.1 | 35.6 | 35.2 | 35.8 |
| % Hard Segment | 43.0 | 42.2 | 42.5 | 42.1 | 42.4 | 42.1 | 42.5 | 42.9 |
| Isocyanate Index | 1.09 | 1.04 | 1.06 | 1.04 | 1.05 | 1.03 | 1.05 | 1.07 |

TABLE 4

Elastomer Properties

| | Example or Comparative Sample No. | | | |
|---|---|---|---|---|
| | 6 | 7 | 8 | C* |
| Secondary amine type | DEOA | MAE | DEA | None |
| Modulus, MPa | 25.6 | 23.3 | 30.4 | 33.7 |
| Stress @ 100% elongation, MPa | 6.9 | 6.4 | 5.9 | 7.0 |
| Yield Stress, MPa | 11.5 | 14.3 | 10.1 | 12.3 |
| Elongation | 190 | 310 | 313 | 280 |
| Shore A Hardness | 89 | 87 | 91 | 92 |
| Tack-free Time, min | 5.2 | 4.3 | 3.8 | 3.9 |
| Demold time, min | 8.1 | 6.4 | 4.8 | 5.4 |
| Surface appearance rating | 2 | 1 | 1 | 5 |

As shown by the data in Table 4, the presence of the secondary amine compound results in a large improvement in surface appearance, with little or no adverse effect on physical properties.

What is claimed is:

1. A process for preparing a noncellular or microcellular polyurethane elastomer, comprising 1) forming a reaction mixture containing a) one or more aliphatic diols having a hydroxyl equivalent weight of from about 30 to about 100, b) one or more secondary amine compounds selected from the group consisting of 2-(methylamino)ethanol, 2-(ethylamino)ethanol, 2-(propylamino)ethanol, 1-methyl-2-(methylamino)ethanol, 1-methyl-2-(ethylamino) ethanol, 1-methyl-2-(propylamino)ethanol, 1-ethyl-2-(methylamino)ethanol, 1-ethyl-2-(ethylamino)ethanol, 1-ethyl-2-(propylamino)ethanol, N-hydroxyethylbenzylamine, N-hydroxypropylbenzylamine, or a mixture of any two or more thereof and at least one of c-1) and c-2), wherein c-1) includes one or more organic polyisocyanates having an isocyanate content of at least 15% by weight and one or more polyols having a hydroxyl equivalent weight of at least 250 and c-2) includes one or more isocyanate-terminated prepolymers or quasi-prepolymers having an isocyanate content of less than 15% formed in a reaction of an organic polyisocyanate with one or more polyols having a hydroxyl equivalent weight of at least 250 and 2) curing the reaction mixture in the presence of a catalyst to form the polyurethane elastomer, wherein:
   A) the reaction mixture contains no more than 0.25% by weight of a chemical blowing agent;
   B) the secondary amine compound contains one or two secondary amino groups, is devoid of primary amino groups, and the combined number of secondary amino groups and hydroxyl groups is from one to two;
   3) the weight ratio of component a) to component b) is from 60:40 to 95:5;
   3) the hard segment content of the polyurethane elastomer is from 30 to 60% by weight; and
   4) the isocyanate index is from 70 to 125.

2. The process of claim 1, wherein component a) constitutes from 6 to 15% of the weight of the reactive materials in the reaction mixture.

3. The process of claim 1, wherein components a) and b) are present in a weight ratio of from 80:20 to 95:5.

4. The process of claim 1, wherein the reaction mixture contains no mercury-containing catalyst.

5. The process of claim 1, wherein the catalyst includes at least one organozirconium or organotitanium compound.

6. The process of claim 1, wherein the catalyst includes at least one tertiary amine-based catalyst.

7. The process of claim 1, wherein the reaction mixture contains less than 0.5% by weight of a crosslinker and less than 0.25% by weight of compounds that contain one or more primary amino groups.

* * * * *